Oct. 23, 1945. K. AURBACH 2,387,554
BOOKKEEPING MACHINE
Filed Aug. 24, 1938 11 Sheets-Sheet 5

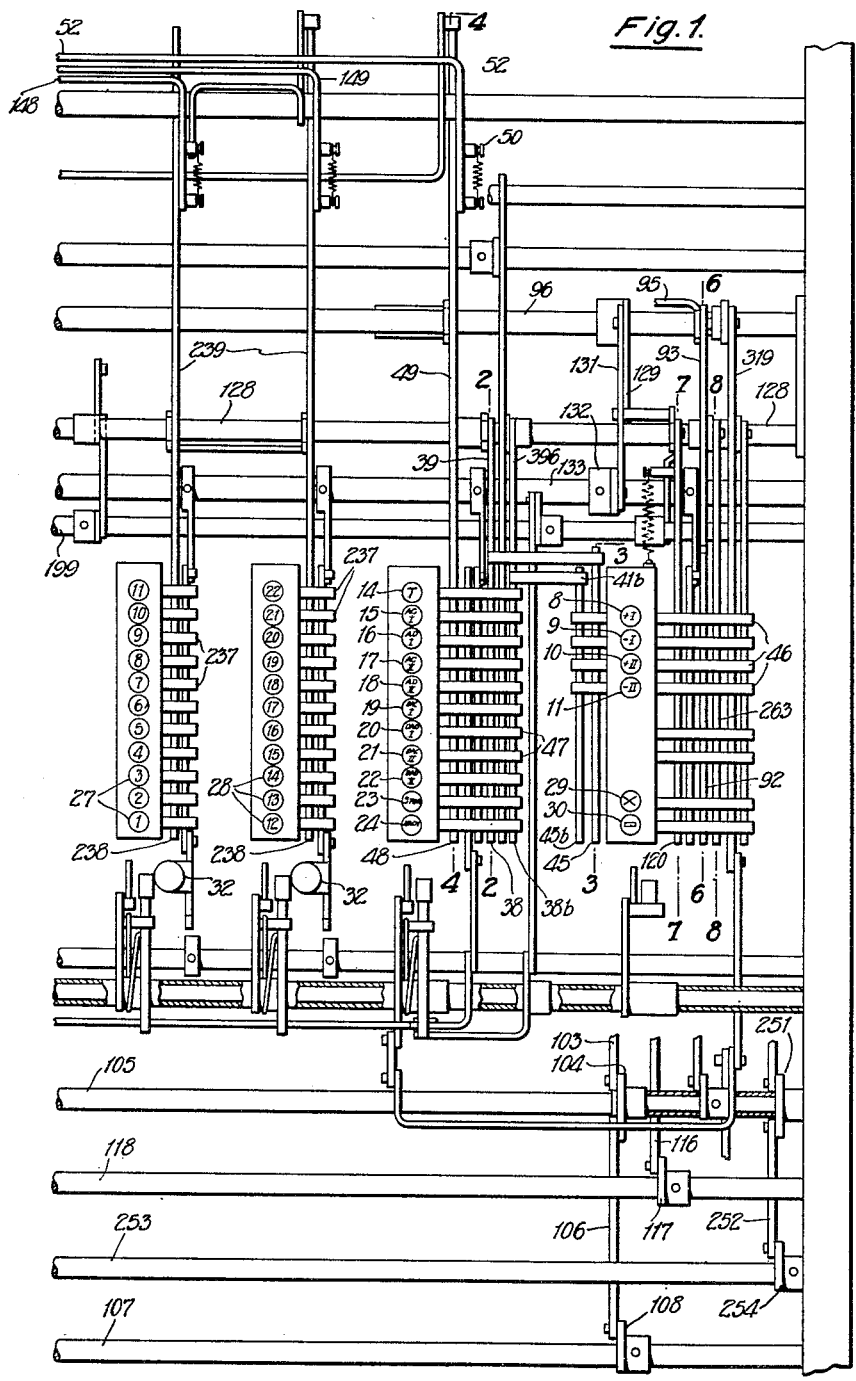

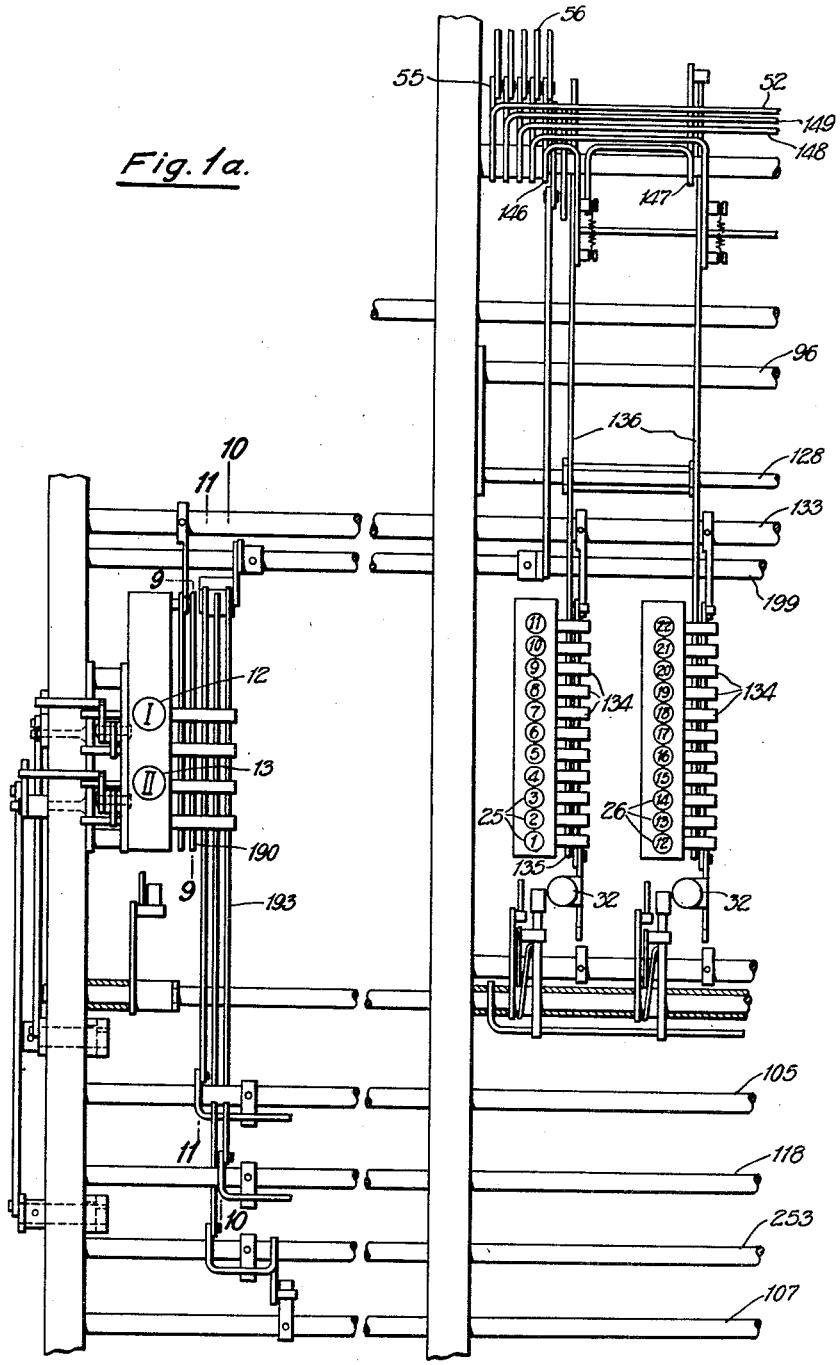

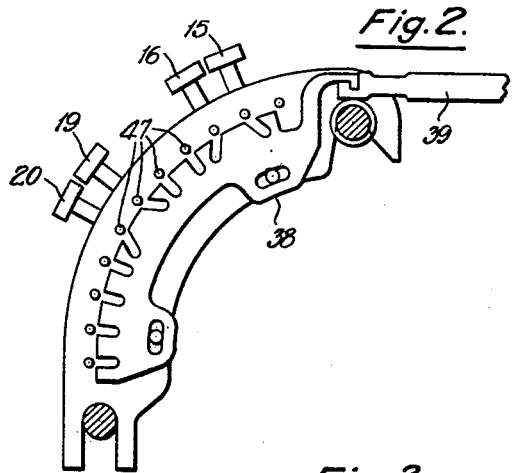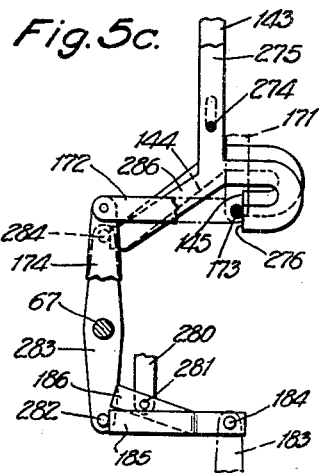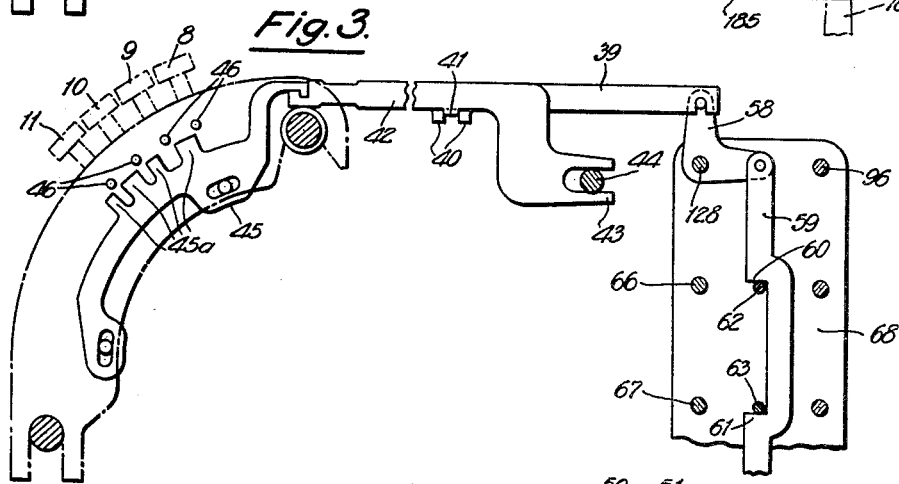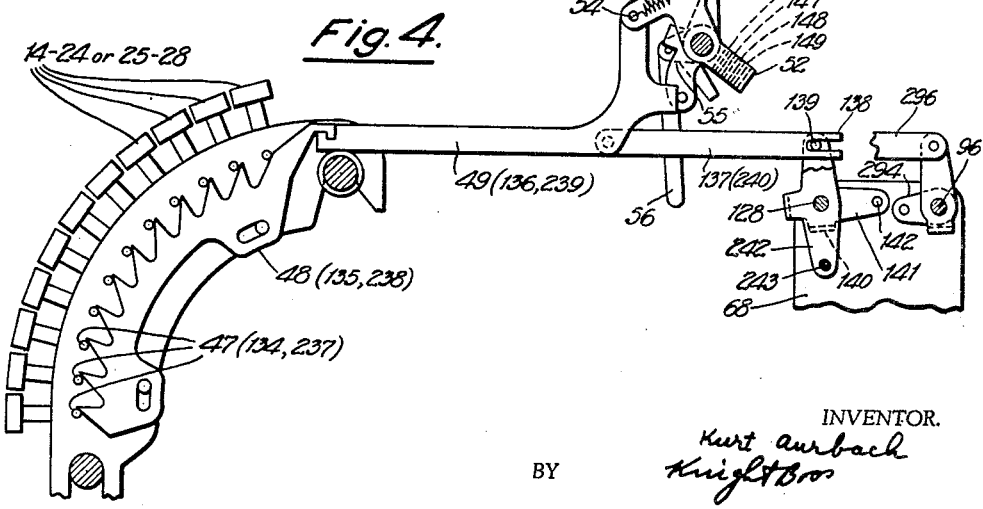

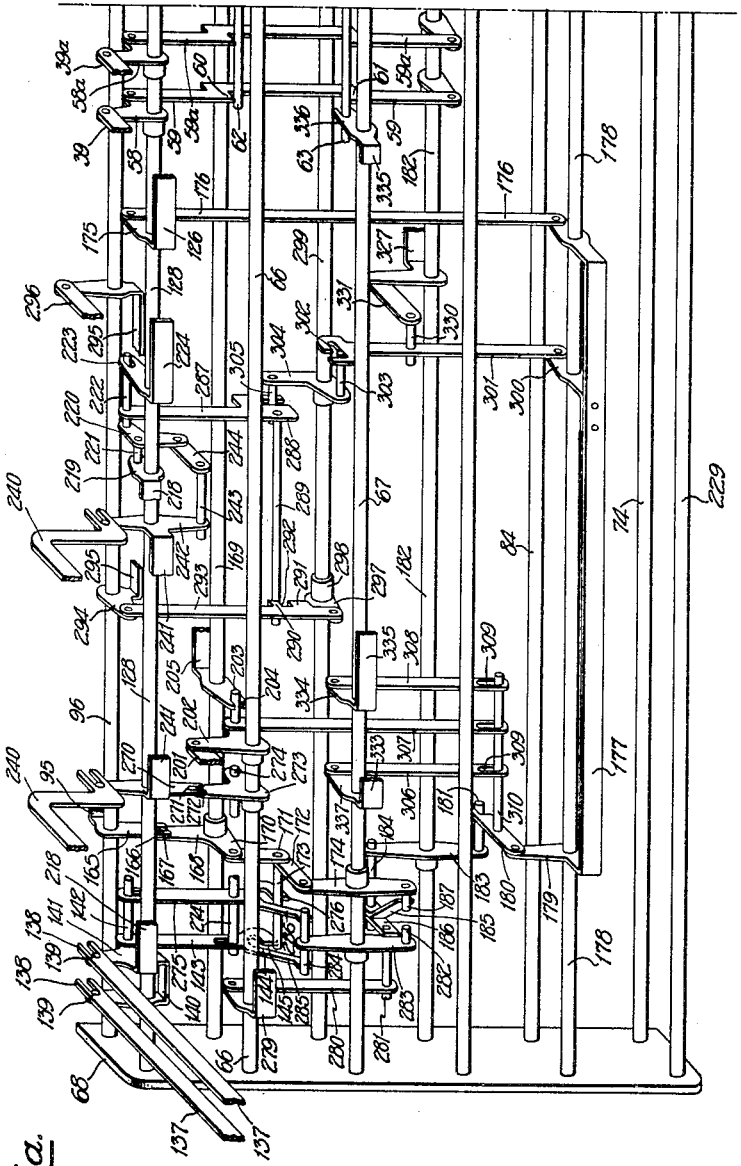

INVENTOR
Kurt Aurbach
BY Knight Bros
ATTORNEYS.

Oct. 23, 1945.  K. AURBACH  2,387,554
BOOKKEEPING MACHINE
Filed Aug. 24, 1938  11 Sheets-Sheet 7
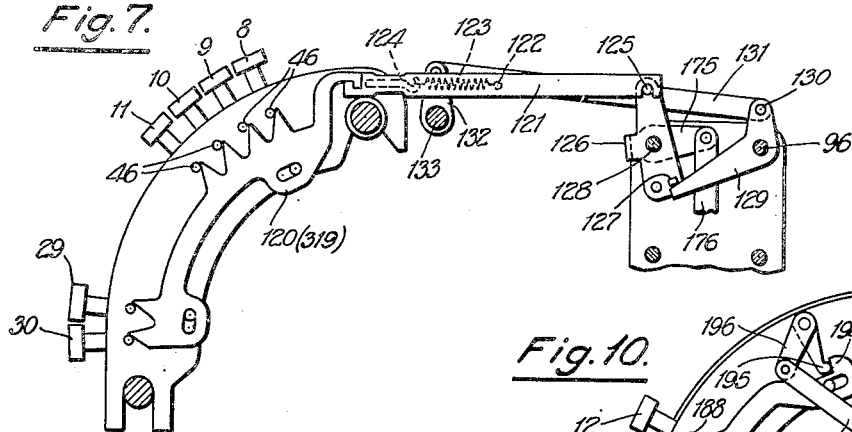
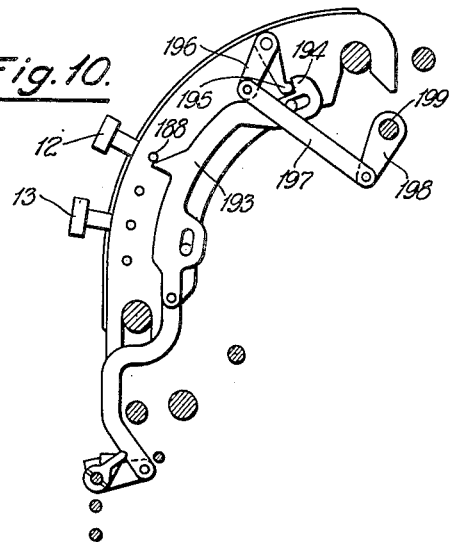
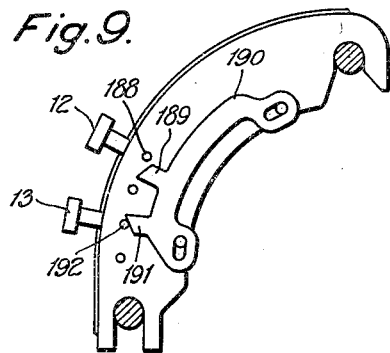
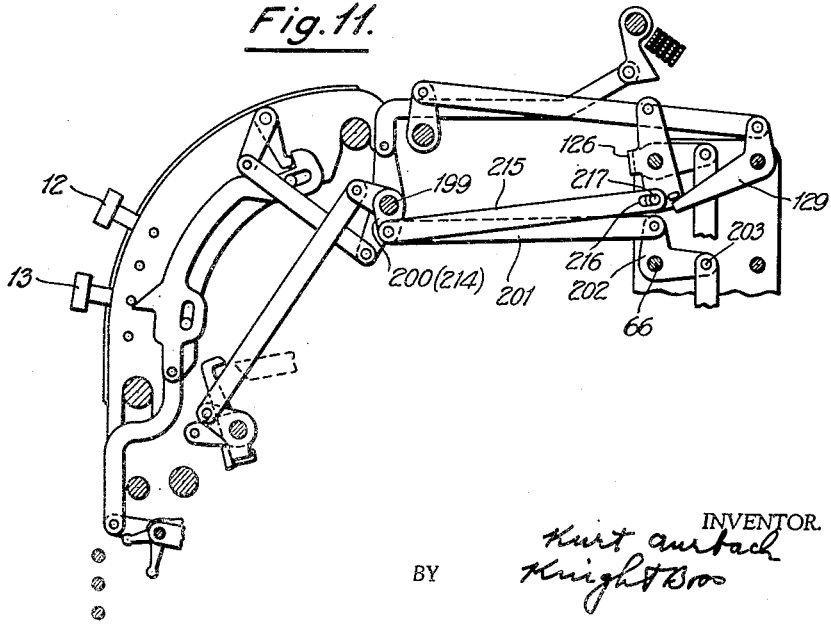
INVENTOR.
Kurt Aurbach
BY Knight Bros
ATTORNEYS.

Oct. 23, 1945.         K. AURBACH         2,387,554
BOOKKEEPING MACHINE
Filed Aug. 24, 1938         11 Sheets-Sheet 9
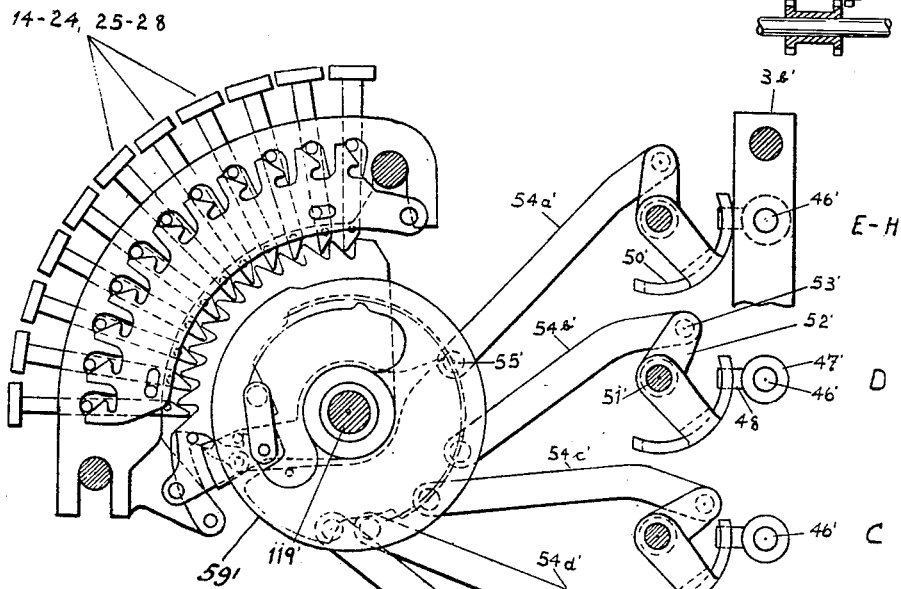
Fig. 17
Fig. 13
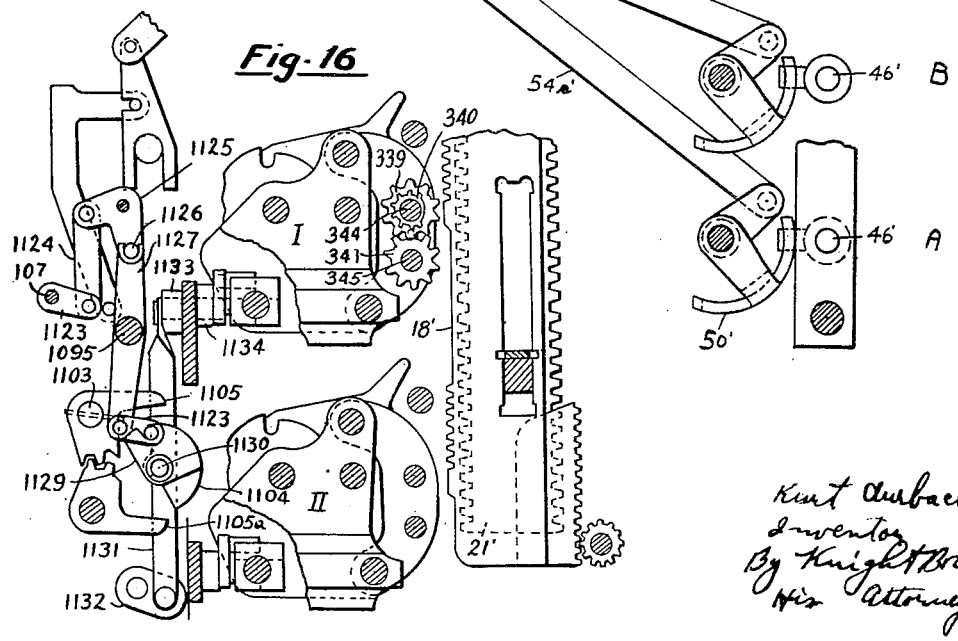
Fig. 16
Kurt Aurbach
Inventor
By Knight Bro
His Attorneys Oct. 23, 1945.   K. AURBACH   2,387,554
BOOKKEEPING MACHINE
Filed Aug. 24, 1938   11 Sheets-Sheet 10
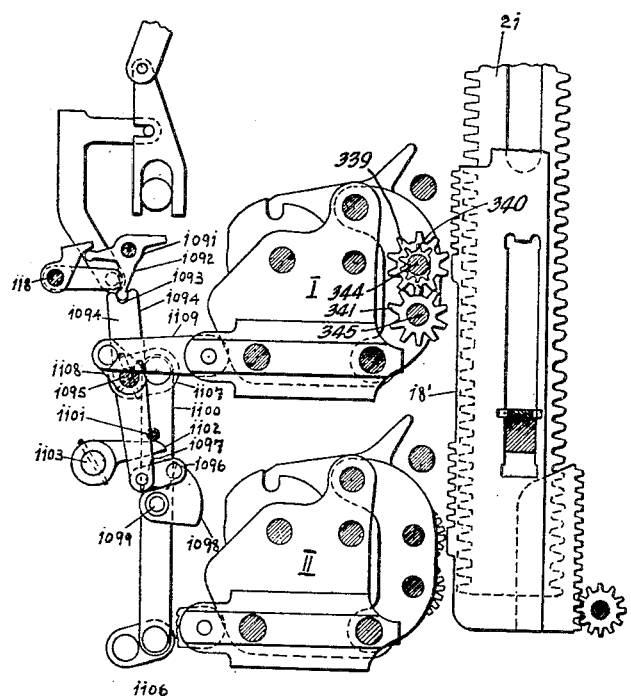
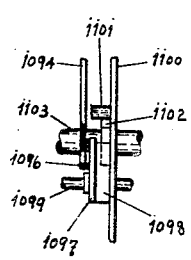

Patented Oct. 23, 1945

2,387,554

UNITED STATES PATENT OFFICE 2,387,554

BOOKKEEPING MACHINE

Kurt Aurbach, Bielefeld, Germany; vested in the Alien Property Custodian

Application August 24, 1938, Serial No. 226,468
In Germany August 27, 1937

10 Claims. (Cl. 235—27)

The invention relates to improvements in bookkeeping machines and is primarily concerned with machines having two balance mechanisms upon which double entry accounts can be computed. Double entry bookkeeping operations may comprise a sequence of steps consisting in entering old balances of an account and a contra-account, posting the debits and credits of the account and the contra-account, and taking the new balances of the account and the contra-account.

According to the present invention the bookkeeping machine is so constructed that under the control of setting means it is possible to carry out bookkeeping sequences consisting of a varying number of operations on one and the same machine. More specifically, the machine can be operated to carry out a sequence in which the old balance, the debits and credits, and the new balance of a single account are entered; or a sequence in which the old balance, the debits and credits, and the new balance of both an account and a contra-account are entered, the posting of the debits and credits to both the account and the contra-account being executed in a single machine operation.

In accordance with another feature of the invention in making entries of the old balance, debits and credits, and new balance in a single account, only a single setting means for the debits and credits is set, while for sequences in which the old balance, the debits and credits, and the new balance are entered in both an account and a contra-account, a plurality of setting means for the debits and credits may be set for a single machine operation.

In accordance with another feature of the invention all the blocking devices are mounted in a special carriage, and can be set into the machine as a unit, occupying the same space behind the special keys which the totalizers occupy behind the amount keys.

While the improvements, which are now to be described in detail with reference to one illustrative embodiment of the invention shown in the drawings, were developed as a part of a bookkeeping machine for double-entry accounting, they are not all restricted to such machines.

The setting and blocking mechanism shown in the drawings of this application is part of a machine whose printing mechanism is shown in my copending application Serial No. 226,467, to which reference is made for a more complete disclosure of those parts of the machine.

Figs. 1 and 1a are two parts of a developed front elevation of the special keyboard and part of its blocking mechanism;

Fig. 2 is a vertical section through the special keyboard on the line 2—2 of Fig. 1;

Fig. 3 is a similar vertical section on the line 3—3 of Fig. 1, showing a portion of the blocking unit;

Fig. 4 is a vertical section similar to Fig. 3 on the line 4—4 of Fig. 1;

Figs. 5a and 5b are two parts of a laterally expanded perspective view of the blocking mechanism unit;

Fig. 5c is a side elevation of a part of the blocking mechanism;

Figs. 6–8 are, respectively, vertical sections on the lines 6—6, 7—7, 8—8, of Fig. 1, each showing a portion of the blocking mechanism unit;

Figure 12:
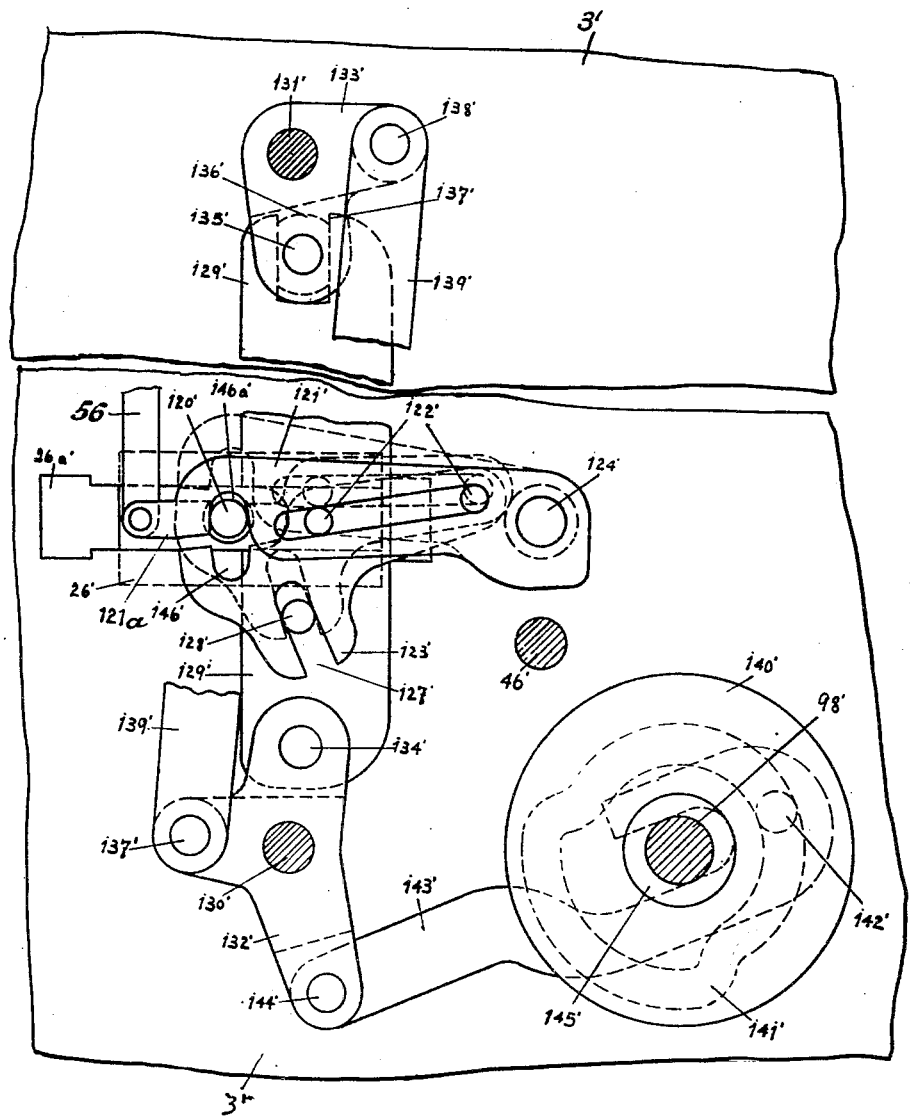
Figure 18:
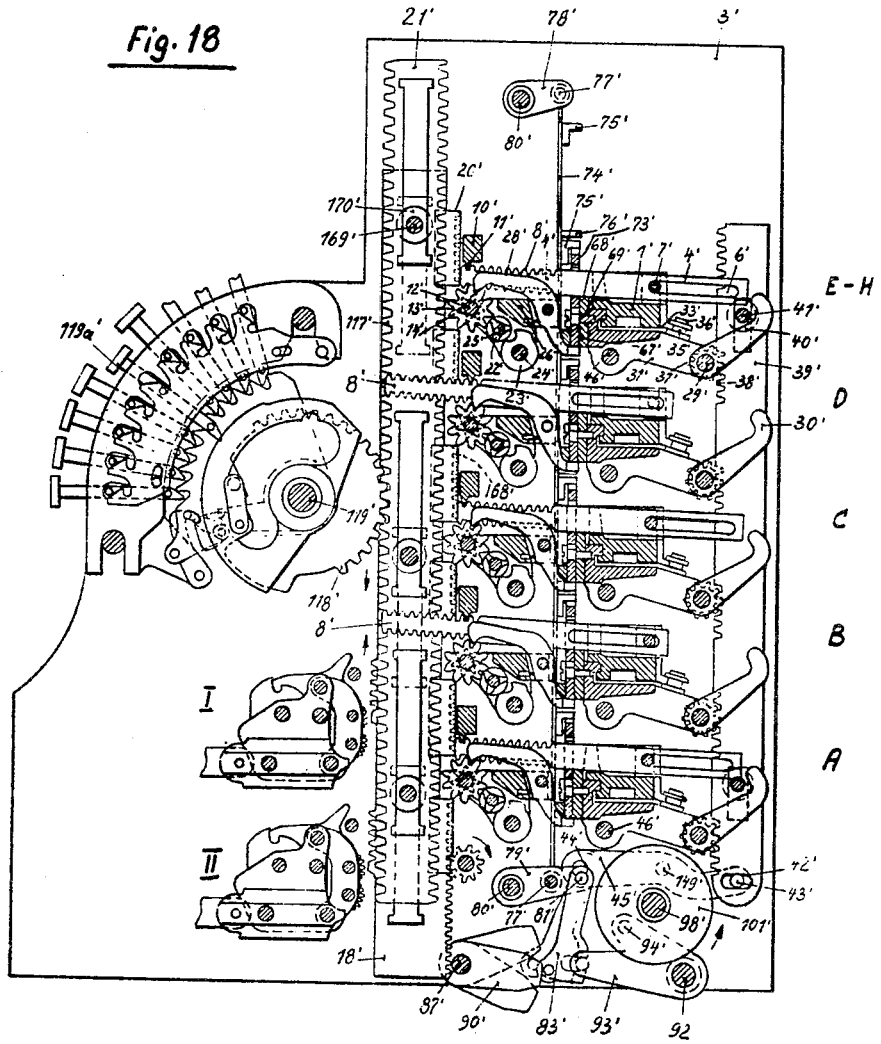

Figs. 9 and 10 are, respectively, vertical sections on the lines 9—9 and 10—10 of Fig. 1a;

Fig. 11 is a vertical section on the line 11—11 of Fig. 1a, showing a portion of the blocking mechanism unit;

Fig. 12 shows the controlling and engaging mechanisms for one set of totalizers;

Fig. 13 is a sectional view of the adjusting mechanism for the totalizers;

Fig. 14 is a sectional view of the engaging mechanism for one of balance mechanisms;

Fig. 15 is a side view, with parts in section, of a portion of the mechanism shown in Fig. 14;

Fig. 16 is a sectional view of the adjusting mechanism for the balance mechanism;

Fig. 17 is a sectional view of a portion of the mechanism shown in Fig. 16;

Fig. 18 is a cross section through the whole mechanism and shows the differential actuating mechanism for the key bank and totalizer mechanisms A—H and balance mechanisms I, II.

The machine has two balance mechanisms I and II (Figs. 14, 16 and 18); also eight totalizers E for the old balance postings, namely, two for each of the old debit balances and the old credit balances, corresponding respectively to the balance mechanisms I and II, and a similar group for entries in the account and contra-account, composed of two each for the old debit balance and the old credit balance, corresponding, respectively, to the balance mechanisms I and II. There are, in addition, 22 totalizers A, B for the debit posting, 22 totalizers C, D for the credit postings, a collective totalizer F for all debit and credit postings together, a totalizer G for cancellations and a totalizer H for corrective entries.

The selection of these totalizers and balance mechanisms is performed by keys, which are arranged in key banks 1–7, as shown in Figs. 1 and 1a. The balance mechanisms I and II are selected for engagement with a differential mechanism 21' (Figs. 14 and 18) by the keys 8, 9, 10, 11 of bank 6 (Figs. 6, 7 and 8) and keys 12, 13 of bank 7. The totalizers E for the old balance entries, the totalizers G and H for the cancellations and corrective entries, and the collective totalizer F for all debit and credit postings are selected for engagement with the differential mechanism by the keys 14–24 in bank 5 (Fig. 13). The selection of the 44 totalizers A, B, C, D for the debit and credit postings is performed by keys 25–28 in banks 1–4 (Fig. 13). The keys 8, 9, 10 and 11 also set the machine for operating the balance mechanisms either additively or subtractively, the keys 12 and 13 (Figs. 9–11) set the machine for resetting the balance mechanisms I and II, the key 29 sets the machine for taking a sub-total from the totalizers of the banks 1–5, and the key 30 sets the machine for resetting the totalizers of the banks 1–5.

The totalizer mechanism, shown in Fig. 18, is the same as that described in Jacob Patent No. 2,029,776. In this application the same reference numerals with a prime mark are used for corresponding parts. Each group of totalizers comprises a series of storage members, in the form of rack bars 4' and a series of pinions 13' rotatably mounted on shafts 12' supported on the side walls 3'. The rack bars 4' are supported on a stationary frame 1' in a way which permits horizontal sliding movement as well as tilting movement in a vertical plane. For this purpose the rack bars are guided by rods 7' passing through slots 6' in the rack bars. The rack bars 4' are arranged in the usual way, with the bars of the same denomination of all the totalizers of the group side by side. The pinions 13' are sufficiently broad to engage all the rack bars of one denomination of one entire group. The rack bars 4' have at their left ends 8' two series of teeth on their upper and lower edges respectively. The upper set of teeth is for engagement with a tongue 11' on a stationary tie bar 10', while the lower set of teeth is for engagement with the pinion 13'. The rack bars can be tilted about the rods 7' to shift them from engagement with the locking bars 10' to the pinions 13', and vice versa. The shifting is accomplished by means of vertical bars 74' swung on arms 78', 79', pivotally supported on rods 80' carried on the side walls 3'. The bars 74' are shifted up and down by a cam mechanism fully disclosed in the said Jacob patent and which will not be described in detail here. Arrangement is made to tilt simultaneously, by means of the bars 74', the individual rack bars 4' of each denomination which constitute one totalizer. For this purpose there is mounted on the bottom of the frame 1' a slide 31', which can be shifted longitudinally on the frame 1' by a mechanism to be described presently. At the face of the slide 31' toward the front of the machine is fixed a plate 68' which has notches spaced at the proper intervals to let down the rack bars 4' of each denomination of a single totalizer. At the front of the plates 68' is a plate 69' mounted so as to have a short vertical movement. The plate 69' has a horizontal slot through which the rack bars 4' extend and on the upper portion 73' above this slot there are at spaced intervals, opposite the notches in the bar 68', downwardly projecting teeth. The plates 69' are positioned between lugs 75', 76', on bars 74', and are thus shifted up and down by movement of these bars. The relation of the horizontal slot in bar 69' to the upper edge of plate 68' is such that when the plate 69' is in its upper position the rack bars 4' are all held at the level of the top of plate 68', while in the lower position of plate 69' those rack bars 4' which are above the notches in plate 68' are permitted to drop into these notches. The action is made positive by the teeth on the upper part 73' of the plate 69'. The longitudinal movement of slide 31' enables the notches in bar 68' and teeth on bar 69' to be brought into registry with any desired set of rack bars 4' constituting one totalizer of the group. The other rack bars are held up into engagement with the locking bars 10' by the upper edge of plate 68'.

Rotatably but non-shiftably mounted on the slides 31' are shafts 29'. These shafts have fixed upon them, at intervals corresponding to the denominational spacing of the totalizer rack bars, arms 30'. The arms on one shaft 29' are adapted to be positioned by the longitudinal movement of slide 31' opposite the ends of the rack bars 4' constituting one totalizer. Mechanism is provided to swing the arms 30' to the left to move the rack bars 4' constituting the selected totalizer to the extreme left position represented by the rack bars of the groups B and D in Fig. 18. Each shaft 29' has fixed to it a broad pinion 37' which meshes with teeth 38' on a bar 39' guided for vertical movement by a rod 41' engaging in a slot 40' of the bar, and by a lever 45' pivoted at 44' to the side wall 3' and articulated by a pin 43' to the lower end of the bar 39'. The lever 45' carries a roller 149' adapted to engage a cam groove (not shown) in a cam wheel 101' fixed on main shaft 98'.

Each shaft 12' carrying pinions 13' is mounted in a carriage 26' (Fig. 12) guided for horizontal sliding movement in slots 26a' in the side walls 3'. The carriages 26' can be moved by mechanism to be described presently to bring gears 14' fixed to pinions 13' into engagement with teeth 20' of differential rack bars 21'. The teeth 117' on the opposite side of rack bars 21' mesh with segments 118' mounted on a shaft 119' and differentially controlled by keys 119a'.

A brief description of the operation of the totalizers by the differential mechanism will now be given, but for a full description reference is made to the said Jacob patent.

In the position of rest of the machine the rack bars 4' are in various positions corresponding to the totals which they represent and are engaged with the locking bars 10', the plates 69' being in their upper positions. The carriages 26' are in their right end positions and gears 14' are out of mesh with the teeth 20'. At the beginning of the operation, after the totalizer has been selected by longitudinal movement of slide 31', through the operation of a mechanism to be described presently, the bars 74' are moved down and the selected rack bars 4' are tilted out of engagement with locking bar 10' and into engagement with pinions 13'. The bar 39' is now lifted and arms 30' swung to the left, coming into engagement with the ends of the rack bars at various points dependent upon the individual positions of the rack bars and moving the latter to their extreme left positions. The pinions 13', which are in zero position at the start of the operation, are turned counterclockwise by amounts corresponding to the movements of the individual rack bars engaged with them. At the end of this movement the rack bars 4' are swung up into engagement with the locking bars 10'. Meanwhile the differential rack bars 21' have been moved idly to the upper limit of their movement by the segments 18'. The totalizer engaging mechanism to be described presently is now brought into operation and shifts the carriages 26' to the left, bringing the gears 14' of pinions 13' into mesh with the teeth 20'. The segments 18' are now turned in clockwise direction by amounts dependent upon the setting of keys 119a', these movements being added on the pinions 13' to the values first transferred to the pinions. At the end of the differential movement the carriages 26' are moved to the right, disengaging gears 14' from teeth 20'. The rack bars 4' are then tilted down again into engagement with pinions 13'. Resetting rack bars 18' are thereupon moved upward by driving means (not shown) and the sets of teeth 168' on the right hand edge of these rack bars engage special parts of the pinions 13' to turn said pinions clockwise into zero position. These movements are transmitted to the rack bars 4', which are thus set into new positions corresponding to the total of the amount previously stored in them and the amount added.

The engagement of the totalizers with the differential mechanism, that is, the engagement of the gears 14' with the teeth 20' of differential rack bars 21', is accomplished by a mechanism fully described in the said Jacob Patent No. 2,029,776. Fig. 12 of this application shows the part of this mechanism at one end of the totalizer groups, the other end being the same, except that it does not include the cam and pitman. At both ends the carriage 26' is fitted with pins 120' protruding from the portion of the carriage 26' guided in slots 26a'. These pins are normally received in notches 146a' of locking levers 121' pivotally mounted on studs 124' on the side walls 3'. Each locking lever 121' carries a sliding plate 123' having a groove to receive supporting pins 122' projecting from the locking lever 121'. Each locking lever 121' has an arm 121a to which is pivotally connected a link 56, operated, in a manner to be described presently, by the keyboard. By means of the links 56 the locking levers 121' can be raised to transfer the pins 120' from the notches 146a' to notches 146' in sliding plates 123'. The sliding plates 123' are provided with slots 127' cooperating with pins 128' on plates 129'. The plates 129' are pivoted at their lower ends by studs 134' on two three-armed levers 132'. The levers 132' are secured to a shaft 130' journalled in the side walls 3'. A connecting rod 139' connects the levers 132' with the two-armed levers 133' by means of studs 137' and 138'. The said levers 133' are fixed to a shaft 131' journalled in the side walls 3'. The downwardly directed arm of each lever 133' carries a stud 135' with a guiding element 136', which engages in a slot at the end of the corresponding plate 129'. A pitman 143', which is pivotally connected to one of the levers 132' by a stud 144' is guided at its opposite end on main shaft 98' and carries an antifriction roller 142' engaging in the cam race 141' of pitman cam 140'. By means of the mechanism above described the plates 129' and the pins 128' are moved horizontally. There is a pair of locking levers 121' and sliding plates 123' for each group of totalizers, each being operated by the bars 129' in the manner described, when prepared by shifting from the full line position of Fig. 12 to the dotted line position.

The devices for carrying out individual posting operations in an orderly fashion are only described insofar as they are essential to the operations of posting to the account and the contra-account.

If a series of entries is to be carried out on the machine, which consists of the old balance, one or more debits or credits, and the new balance, after setting up the corresponding amount in the amount setting field 31, one of the keys 15-18 for the "old balance" is pressed, which brings into effect a mutual locking device (not shown), preventing depression of another key in the bank 5. In addition, the machine releasing keys 9, 10, and 11 are locked when the key 15 is depressed, the keys 8, 10, 11 are locked when the key 16 is depressed, the keys 8, 9, 11 are locked when the key 17 is depressed, and the keys 8, 9, and 10 are locked when the key 18 is depressed. A blocking of the debit and credit totalizer banks 1-4 does not occur, because even if one of these keys has been pressed during the entry of an old balance, a transmission of the amount set to the selected debit or credit totalizer does not occur; likewise, in this case there is neither a printing of the corresponding special sign of the debit or credit totalizer, nor an advancement of the corresponding item counter. By depression of the corresponding unblocked key in bank 6 the machine is released for operation and the old balance is entered in the corresponding old balance totalizer E, as well as in the corresponding side (plus or minus) of the balance mechanism I or II. Also, the proper columns of several record sheets are selected and printed, as will be described in part herein and more fully in my copending application Serial No. 226,467.

The posting of the debits or credits is carried out by first setting up the amount in the amount setting field, then pressing one of the debit or credit totalizer keys in the banks 1-4, then releasing the machine for operation by pressing the proper key 8-11 in the bank 6. During this machine operation the debit or credit item of an account is transmitted to the corresponding debit or credit totalizer A—D, as well as to the proper side of the balance mechanism I or II. Also, the corresponding columns of several record sheets are selected and printed. Since there is no blocking means between the banks of keys 1-4 and the bank 5, the debit or credit totalizer key which has been pressed becomes inoperative, if a key in the bank 5 has also been pressed, while the depressed key in the bank 5 controls the operation of the machine. In such a case, accordingly, the machine either enters an old balance, a cancellation, or a corrective amount.

If by mistake a key in the debit banks 1 or 2, as well as a key in credit banks 3 or 4 has been pressed, the machine will carry out, in a manner to be described presently, a posting operation including, insofar as the debits and credits are concerned, a posting to the account and to the contra-account. In such a case the releasing keys 8-11 in bank 6 are free for operation.

In order to determine the new balance of an account, which may be positive or negative, it is only necessary to press either of the releasing keys 12 or 13, whereby the corresponding balance mechanism is reset to zero and the total is printed in a corresponding column of the record sheet. There will follow a detailed description of the mechanical devices for carrying out these operations.

The old balance of an account, which customarily precedes a series of entries, is introduced by setting the corresponding amount in the amount setting field 31 and pressing one of the keys 15–18, for instance the key 15. Mechanism is provided to block all of the keys of bank 6, except the key 8 corresponding to key 15. For this purpose a slide 38 (Figs. 1 and 2) is mounted adjacent the key bank 5, which is pushed downward by depression of the key 15. A thrust bar 39 connected to slide 38 is provided with two fingers 40, which straddle a finger 41 (Fig. 3) of a thrust bar 42. The thrust bar 42 has a forked end 43 guided upon a shaft 44 and is connected with a slide 45 located beside the key bank 6. This slide has lugs 45a adapted to block pins 46 on keys 9, 10, and 11, when moved downward by the depression of key 15, or to block pins 46 of keys 8, 10, 11 when moved upward by depression of key 16. In the case under consideration the keys 9, 10 and 11 are blocked.

A blocking mechanism 38b, 39b, 41b, 45b (Fig. 1) similar to the one just described is provided between the keys 17 and 18 and the keys 8–11, which blocks the keys 8, 9, 11 when the key 17 is pushed, and the keys 8, 9, 10 when the key 18 is pushed. This mechanism will not be explained in detail, in view of its similarity to the one just described.

At the same time depression of the key 15 conditions means to effect the engagement of the corresponding old balance totalizer, which is to become effective during the machine operation. For this purpose a slide 48 (Figs. 1 and 4) beside the key bank 5 is moved in clockwise direction by the pin 47 on key 15. This slide is coupled to a thrust bar 49, which bears a pin 50 engaging in a slot 51 of a bail 52. The thrust bar 49 is yieldingly coupled to the bail 52 by a spring 53, one end of which is attached to the pin 50 and the other to a pin 54 on the bail 52. The bail 52 has an arm 55 to which is connected the link 56 that serves to couple the carriage 26' to the totalizer engaging mechanism.

The mechanism for selecting the individual totalizers within each group is shown particularly in Fig. 13. The keys 14–24 and 25–28 represented in this figure control a differential mechanism mounted on shaft 119', which need not be described in detail. To a plate 59' differentially controlled by the keys are pivotally attached links 54a'–54e'. The opposite ends of these links are connected at 53' to arms 52' of spirally slotted cam members 50' fixed upon shafts 51'. The slots of cams 50' receive pins 48' of collars 47' fixed to shafts 46'. The shafts 46' are thus shifted axially during the machine operation and being fixed to the sliding frames 31', as seen in Fig. 18, serve to slide the frames 31' for selecting the totalizer to be operated, as previously described.

As shown in my copending application Serial No. 226,467 the machine has a printing mechanism for printing the old balances, debits, credits, and new balances in separate columns of several record sheets. The selection of the old balance column for printing is one of the functions of keys 15–22. For this purpose the thrust bar 39 (Figs. 2 and 3) acts upon a bell crank lever 58 rockably mounted upon a shaft 57. To this bell crank lever is connected a bar 59 having two shoulders 60 and 61, which cooperate with two pins 62 and 63, which are fixed respectively to two toothed levers 64 and 65 (Fig. 5). The thrust bar 39 is controlled by the keys 15, 16, 19, and 20 and a thrust bar 39a (Fig. 5) similarly controlled by keys 17, 18, 21, and 22, acts in the same way through a bell crank lever 58a and shouldered bar 59a upon pins 62 and 63. The toothed levers 64 and 65 are rockably mounted respectively upon shafts 66 and 67. The shafts 66 and 67 are mounted in two side plates 68 of the blocking unit. To the lever 65 is connected, by a pin 69, a link 70, whose lower end is connected at 71 to the arm 72 of a bail 73. The bail 73 is rockably supported upon a shaft 74, which is also mounted in the side walls 68. The bail 73 extends beyond the right-hand side wall 68 and has at its right-hand end an arm 74a, to which is secured a pin 75. The pin 75 is connected to a link 76, whose other end is articulated to an arm 77 of a bell crank lever 78. The bell crank lever 78 is rockably supported on a pin 79 secured to a thrust bar 80. The lower forked end of thrust bar 80 is guided upon a pin 209 fixed upon a side plate 85, while its upper end is connected to an arm 328 of a bail 327, for a purpose to be described presently. A bent-over end 78a of bell crank lever 78 coacts with a finger 81 of a bar 82. A fork 83 of bar 82 is guided upon a rod 84, which is mounted in the side walls 68 and 85. A notch 86 of bar 82 engages over the upper end of a lever 746 rockably mounted upon a pin 751. The pin 751 is fixed in a bell crank lever 87, which is rockably mounted upon the casing wall 506 by means of a pin 88. A fork 90 of lever 87 engages over a pin 89 of a lever 91, which in each machine operation is rocked first clockwise and then counterclockwise, by driving means not shown. The lower end of lever 746 engages in a recess 743 of an upturned lug 742 of a slide 739. The clockwise rocking of lever 91, which swings bell crank lever 87 in counterclockwise direction, also turns the lever 746 in clockwise direction on its pin 751, because the end of lever 746 engaging in the notch 86 is held fast by the bar 82. Consequently the lever 746, whose lower end 743 engages in the fork 742, moves the slide 739, with the result that the printing mechanisms are positioned for printing in the old balance columns of all the record sheets, through a mechanism described in my said copending application Serial No. 226,467.

Following the depression of key 15, the unblocked releasing key 8 (Fig. 6) is pressed. This key has, in addition to its machine releasing function, the functions of determining whether the balance mechanism is to be operated positively or negatively, and selecting the proper balance mechanism for engagement. For these purposes there is provided beside the key bank 6 a slide 92 (Fig. 6), having oppositely inclined shoulders 92a and 92b for coaction with the respective pins 46 of keys 8 and 9. The slide is moved oppositely by these pins, the pin of key 8 moving it upward. A thrust bar 93 is coupled to a slide 92 and is connected by a pin 94 to a bail 95 rockably supported upon a rod 96 mounted between the side walls 68. To an arm 97 of bail 95 is connected a link 98, whose lower end is coupled by a pin 99 to a bail 100. The bail 100 is rockably mounted on a rod 84 and has fixed to it a pin 101 which engages in a slot 102 of a rod 103. The rod 103 is connected to a bell crank lever 104, which is loosely rockable upon a shaft 105. To the other arm of the lever 104 is connected a link 106, which is articulated at its opposite end to a lever 108 secured to a shaft 107. This shaft serves for lateral displacement of the balance mechanism, according to whether the latter is to be operated for positive or negative registration of an amount. A lever 1123 (Fig. 16) fixed to shaft 107, rotates a plate 1104 by means of parts 1124, 1125, 1127 and 1128. The plate 1104 is rotatably mounted by pin 1130 on rod 1131 and controls the movement of rod 1131, caused by the differential mechanism 1105, 1105a acting on plate 1104. The movement of rod 1131 is transmitted through parts 1133, 1134 to cause a lateral movement of balance mechanism I from debit to credit position, or in the reverse direction. The balance mechanism consists essentially of adding wheels 339 (Figs. 14, 16 and 17), which are fixed to zero setting wheels 340 and subtracting wheels 341. The latter are connected to the adding wheels 339 by pinions 342, 343. The adding and subtracting wheels 339, 340 are freely revoluble upon axles 344, 345. In adding operations the adding wheels 339 engage the rack bars 21', while in subtracting operations the subtracting wheels 341 engage the rack bars. In zero setting operations the zero setting wheels 340 engage the zero setting rack bars 18', so that the amount in the balance mechanism is transmitted through the subtracting wheels 341 to the rack bars 21'.

The engagement of the balance mechanism and adding racks 21' is effected by the following linkage. Upon the bar 98 (Fig. 6) is fixed a pin 109, adapted to act upon an arm 110 of a toothed sector 111. The toothed sector 111 is supported upon a rod 112 and meshes with a toothed sector 113 rockably mounted upon rod 84. An arm 114 of toothed sector 113 stands in contact with the pin 99. The two arms 110 and 114 of toothed sectors 111 and 113 are connected by a spring 119, which pulls them into contact, respectively, with the pins 109 and 99. A second arm 115 of toothed sector 113 carries a rod 116 which is coupled to a lever 117 secured to a shaft 118. This shaft serves for coupling the balance mechanism with the differential members. A lever 1089 (Fig. 14) fixed on shaft 118 acts upon a three-armed lever 1091, whose arm 1092 meshes with a notch 1093 of a crank lever 1094 rotatably mounted on a shaft 1095. The crank lever 1094 is connected with the plates 1097/98 by a link 1096. The plates 1097/98 are rotatably mounted by pin 1099 on a rod 1100 and cooperate with an arm 1102 fixed on shaft 1103. The rod 1100 is supported by arms 1106/07 and, driven by arm 1102 which engages plate 1098 for downward movement, or pin 1101 for upward movement, acts through parts 1108/09 to shift the balance mechanism I in one or the other direction.

One of the functions of the keys 8—11 is to release the machine for operation. For this purpose there is mounted beside the key bank 6 a slide 120 (Fig. 7) having cams 120a to be engaged by the pins 46 of the keys. The slide 120 is connected with a thrust rod 121 which bears a pin 122 over which is engaged one end of a spring 123. The opposite end of the spring is engaged by a hook 124 mounted in the frame of the key bank 6. The thrust rod 121 engages over a pin 125 of a bail 126, which carries a square pin 127 and is rockably mounted upon a shaft 128. With the square pin 127 cooperates a lever 129 rockably mounted upon shaft 96 and having an arm 130 connected to a link 131. The link 131 is connected to a lever 132, rigidly secured to the releasing shaft 133 which causes the release of the machine. The releasing shaft stands under the pull of a spring (not shown) and swings in clockwise direction when the lever 129 is released by the square pin 127.

The debits and credits of an account are posted by first setting the amount in the setting field numeral key board 31 (Figs. 1 and 1a) and then pushing one of the keys 25—28 (Figs. 1 and 1a) in the key banks 1—4, for instance, a key 26 in the key bank 2. Since this key is a debit totalizer key, the amount is to be negatively entered in the balance mechanism. By pushing a key 26 a blocking device, which need not be described, between the key banks 1 and 2 becomes effective, so that in the key bank 1, whose keys 25 are also debit totalizer keys, no key can be pushed. A similar blocking device is arranged between the key banks 3 and 4.

The key 26 in the special key bank 2, upon depression, operates through the parts 134, 135, 136 (Figs. 1, 1a and 4) to condition the corresponding debit totalizer for engagement with its differential racks, as has already been described for conditioning the Old Balance totalizer for engagement with its differential racks. The bails 146, 147, 148 and 149 (Figs. 1 and 1a) for conditioning the engagement of the debits and credits totalizers, correspond with the bail 52.

These bails control mechanisms such as shown in Fig. 12, to shift the totalizer pinions 13' of each group of totalizers into and out of engagement with their corresponding differential racks or members 21'.

The adjusting mechanism for the series of debit and credit totalizers A—D corresponds with that heretofore described in connection with the totalizers E—H.

The depression of a key in either of the banks 1, 2 also releases a blocking device for the release key 9 of bank 6, while depression of a key in either of banks 3, 4 releases a blocking device for the release key 8. For this purpose there are mounted beside the key banks 1 and 2 slides 135, corresponding to the slide 48 of the key bank 5. These slides are moved upwardly by the pins 134 of the keys 25 or 26 and each is coupled to a thrust rod 136 (Figs. 1 and 4). Each thrust rod 136 is connected to a link 137, whose fork 138 engages a pin 139 of a bail 140. The bail 140 is rockably mounted upon shaft 128 and has an arm 141 bearing a pin 142 upon which are hung two blocking bars 143 and 275. The blocking bar 143 (Fig. 5a) is shifted by operation of a key of the banks 1 and 2; the blocking bar 275 by a key of the banks 3 and 4. The blocking bar 143 has a recess 144 open at one side and below this a blocking face 145. This blocking bar is moved downward a short distance by depression of any one of the keys of the banks 1 and 2. The blocking bar 275 is shaped similarly to the blocking bar 143, having a recess 275a and adjoining blocking face 276. The bar 275 is fixed to a pin 274 mounted on a bell crank lever 273, which is rockably supported on shaft 66. A pin 272 on the upwardly extending arm of bell crank lever 273 engages in the fork 271 of an arm 270 of a bail 241. The bail 241 is rockably mounted on shaft 128 and its two upwardly extending arms are respectively engaged by the forked ends of the two thrust bars 240. These thrust bars are connected to bars 239 (Fig. 4) actuated by slides 238 mounted beside the key banks 3 and 4. The slides 238 are moved upwardly on depression of any of the keys in these banks, by the pins 237 of the keys. This motion shifts the blocking bar 275 upward for a short distance. The bars 275 and 143 are independently movable in vertical direction, due to the pin and slot connections between them, but are both sustained against horizontal movement by the pins 274 and 142.

Figure 5B:
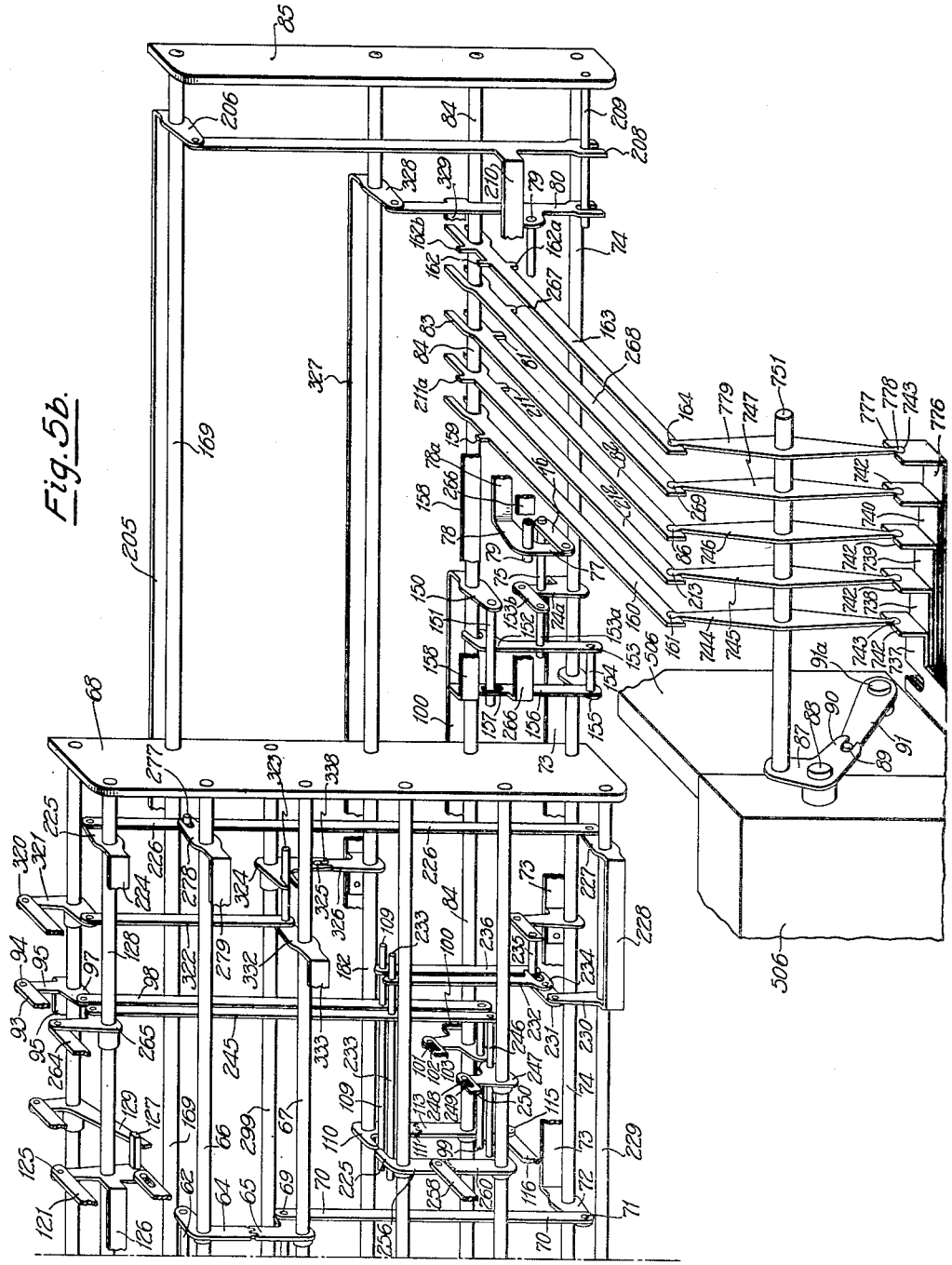
Figure 6:
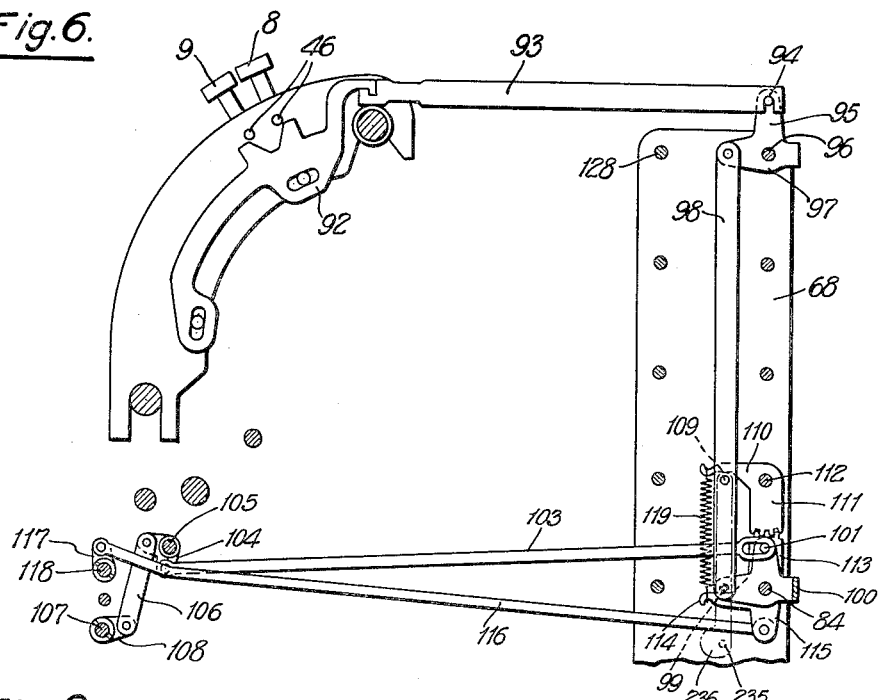

Coacting with the blocking bars 143 and 275 (Fig. 5a) is a pin 173, (Fig. 5c), which is supported and positioned by two links 171 and 172 pivotally connected together by it. In any machine operation in which no key has been depressed in any of the rows except 1–4, the pin 173 is positively moved by the actuation of one of the releasing keys 8, 9, along one of two definite paths, which are different for each key, but both of which cross the plane of the blocking faces 145 and 276. The position of the blocking bars 143 and 275 determines which of the keys 8, 9 can be pushed to release the machine. The link 171 is connected to the forwardly extending arm 170 of a bell crank lever 168 rockably mounted upon a shaft 169. The upwardly extending arm of this bell crank lever bears a pin 167 engaging in the fork 166 of an arm 165 projecting downward from the bail 95. This bail, as previously described, is rocked either clockwise or counter-clockwise by depression of the key 8 or the key 9 (Fig. 6). This rocking movement shifts the pin 173 upward or downward for a short distance, through the connections described. The blocking faces 145 and 276 of the blocking bars 143 and 275 are somewhat staggered. In the normal position of these blocking bars the pin 173 is moved upward to the level of recess 275a by depression of the releasing key 9, but is opposed to the blocking face 145. The operation of one of the keys of the banks 1 and 2 moves the blocking bar 143 downward till its recess 144 is in alignment with the recess 275a, thus leaving the pin 173 free to be moved rearward, in a manner to be described presently. On the other hand, if the pin 173 is moved downward by depression of the releasing key 8, it comes below the blocking face 145, but is still opposed by the blocking face 276. Movement upward of the blocking bar 275 by depression of one of the keys of the banks 3 and 4 removes the blocking face 276 from in front of the pin 173. The pin 173 is forced to execute a movement toward the blocking bars 143 and 275 each time either of the releasing keys 8 or 9 is operated. For this purpose the bail 126, (Figs. 5a and 5b) which is rocked in clockwise direction (Fig. 7) by depression of a key of the bank 6, as previously described, has an arm 175 (Fig. 5a) to which is connected a link 176, the lower end of which is articulated to a bail 177 rockably mounted upon a shaft 178. An arm 179 of bail 177 carries a pawl 180, which acts upon a pin 181 of a lever 183 rockably supported on shaft 182. The lever 183 has fixed to it a pin 184 which carries a double pawl 185, 186, whose arm 185 acts upon a pin 187 of a lever 174 rockably mounted on shaft 167. The upper end of this lever is articulated to the previously mentioned link 172, at the rear end of which the pin 173 is fixed. Through this mechanism the pin 173 is forced to move toward the blocking bars 143 and 275 whenever any key of the bank 6 is pushed. Thus only the key 8 which moves the pin 173 downward can be operated when a key of banks 3 or 4 has been set, and only the key 9 which moves the pin 173 upward can be operated when a key of banks 1 or 2 has been set. Depression of either the key 8 or the key 9 releases the machine operation by withdrawing the square pin 127 (Fig. 7) from the lever 129, in the manner previously described.

The keys 10 and 11 release operations for entries in balance mechanism II, being coordinated with keys 17 and 18 for this purpose in the same way as keys 8 and 9 are coordinated with keys 15 and 16.

Depression of either key 8 or key 9 effects the engagement of the corresponding side of the balance mechanism with the differential mechanism in the manner previously described. For instance, by pushing the release key 9 the slide 92 (Fig. 6) is pushed in counterclockwise direction and through the parts 93, 94, 95, 98, 99, 100 the pin 101 is moved in the slot 102. There is no displacement of the balance mechanism, although it is a debit posting, because the balance mechanism returns to subtraction position after each machine operation. On the other hand, the pin 99 acts upon the arm 114 of toothed sector 113, whereby the latter is swung in clockwise direction and moves with it the rod 116. Through the lever 117 shaft 118 is turned in counterclockwise direction and thereby the balance mechanism is shifted into engagement with the differential members.

For the selection of the proper column of the record sheet the bail 100 (Fig. 5) is provided with an arm 150, which has fixed to it a pin 151. The pin 151 projects into a slot 152 of a pawl 153, which is rockably mounted upon a pin 154 fixed to a lever 155 rockably supported on a shaft 74. Upon pin 154 there is also provided a thrust bar 156 having a slot 157 which embraces the pin 151. The thrust bar 156 has a bent-over arm 158 which coacts with a finger 159 of a bar 160. A notch 161 of bar 160 engages the upper end of a lever 744, which corresponds to the lever 746 and has a similar effect, but with this difference, that through the parts 742, 743, 737 the debits column of the record sheet is selected. The bent-over arm 158 coacts at the same time with a finger 162 of a bar 163 having a socket 164 engaging over the top of a lever 779. By the bar 163, the lever 779, and the parts 777, 778 and 776, the type wheel for the special sign (not shown) is moved into printing position, as disclosed in my aforesaid copending application Serial No. 226,467.

The thrust bar 156 has a second bent-over arm 266 which coacts with a finger 267 on the lower side of a bar 268. This bar has a notch 269 engaging the upper end of a lever 747 rockably mounted on pin 751. The lever 747 acts upon a slide 740 to cause the printing mechanism to print in the credit columns of the record sheets, in a manner similar to the other levers of the group. The arm 266 also coacts with a finger 162a on the lower side of bar 163, to control the setting of the special type wheel. As previously explained, the bail 100 rocks in clockwise direction for engaging the addition side of the balance mechanism with the differential mechanism, and in counterblockwise direction for engaging the subtraction side. Correspondingly, the arm 266 is engaged with the finger 267 for credit entries and the arm 158 with finger 159 for debit entries.

When a key in the special key bank 5 is pressed at the same time as a key in one of the banks 1–4, the operation of the machine is controlled by the key in the bank 5. Accordingly, the mechanism for selecting the debit or credit column of the record sheets is disabled. For this purpose, the link 153 which has a notch 152 normally engaging pin 151 is connected by a pin 153a and a link 153b to the arm 74a of the bail 73. By this linkage rocking of the bail 73 in clockwise direction, which occurs when any key of the bank 5 is pressed, disconnects the link 153 from the pin 151 and the rocking of bail 100 is without effect upon the thrust bar 156.

When the new balance of a bookkeeping operation is to be drawn, the key 12 is pressed. This new balance may be either positive or negative. By depression of this key the corresponding side (plus or minus) of balance mechanism I is placed opposite the differential members and the machine is set for total taking.

The total taking mechanism for the balance mechanism is described in the German Patent 606,799 on page 3, line 78 to page 4, line 42.

The key 12 also acts by its pin 188 (Fig. 9), upon a cam 189 of a slide 190, whose cam 191 coacts with pin 192 of key 13. By this device operation of key 13 appertaining to balance mechanism II is prevented, while conversely by depression of key 13 the key 12 is locked against depression.

A setting of key 12 also acts to select the proper column of the record sheet. For this purpose a slide 193 (Fig. 10) is mounted beside the key bank 7 so as to be movable in counterclockwise direction by the action of pin 188 of key 12. A nose 194 on slide 193 acts upon a lever 195, which has fixed to it an arm 196 connected to a link 197. The other end of the link is articulated to a lever 198, which is rigidly fixed to a shaft 199 (Fig. 11). Upon the shaft 199 there is also fixed a lever 200, to which is connected a link 201. The opposite end of this link is connected to a bell crank lever 202 rockably mounted on shaft 66. A pin 203 fixed to lever 202 (Fig. 5) projects into a fork 204 of a bail 205. This bail is rockably mounted upon shaft 169 and extends to the extreme right end of Fig. 5, where its arm 206 is connected to a thrust bar 207 guided by fork 208 upon pin 209. This pin is fixed to the side wall 35. A lateral arm 210 of thrust bar 207 coacts with a finger 211 of a bar 212. A recess 213 of the bar 212 engages over the upper end of a lever 245, which corresponds to the levers 744, 746 and 749 and has a similar effect, only with the difference that through the parts 742, 743, 738, it selects the new balance column of the record sheet for printing.

By the operation of key 12 the release of the machine is effected through parts 188-199 (Figs. 10 and 11). The shaft 199 has fixed to it a lever 214, which is rocked in clockwise direction by depression of the key 12, thereby pulling forward a link 215, which has a slot 216 at its rear end engaging over a pin 217 on bail 126. Clockwise rocking of the bail 126 causes the release of the machine, in the manner previously described.

A blocking device (not shown) may be provided to block the keys 8-11 when one of the keys 12 or 13 is pushed, while depression of the keys 29 or 30 would set the machine for taking sub-totals and end-totals from the totalizers and would block the keys 8-13.

In contrast to a sequence of operations in which entries are made of an old balance, one or more debits or credits, and the new balance of a single account, a series of entries consisting of an old balance of an account and a contra-account, debits and credits of the account and the contra-account, and the new balance of the account and the contra-account are carried out in the following manner:

The entry of the old balance is performed in such a booking operation in the same way as described in the previous part of this specification, with the single difference that the old balance of the account is first entered in one machine operation and then the old balance of the contra-account in another machine operation.

A change in the procedure in posting to an account and a contra-account of an account owner occurs only in the posting of the debits and credits, because in this case in one and the same machine operation both the account and the contra-account of the account owner are to be posted. Consequently in posting debits and credits there must be pressed one of the keys 25 or 26 and in addition one of the keys 27 or 28, disposed, respectively, in the adding totalizer key banks 1 or 2 and 3 or 4.

Drawing a new balance of an account and a contra-account is carried out in the same way as described in the previous part of this specification with reference to drawing the new balance of a single account, with the sole difference that first the new balance of the account is drawn and then the new balance of the contra-account.

For better understanding of the present invention there will be more fully described debit and credit postings in which the account and the contra-account are simultaneously posted in one machine operation.

Operations of the machine in which an account and a contra-account are simultaneously posted are set up by pushing both a key in one of the banks 1 or 2 and a key in one of the banks 3 or 4.

Depression of a key 25 or 26 of the key banks 1 or 2 causes the selection of the corresponding debit totalizer in the manner previously described, while depression of a key 27 or 28 of the key banks 3 or 4 causes the selection of the corresponding credit totalizer.

By mechanism to be presently described, the setting of these two keys causes each of the releasing keys 8 or 9 to be effective for engaging both balance mechanisms I and II, but for opposite operation, that is, one positive and one negative. That is to say, the key 8 sets the balance mechanism I for positive operation and the balance mechanism II for negative operation; while the key 9 has the reverse effect. Key 11 has the same effect as key 8, while key 10 has the same effect as key 9. Since the blocking mechanism 143, 275, 173 (Fig. 5a) would prevent releasing of the machine when both debit and credit keys in the banks 1-4 have been set, this blocking mechanism is disabled and another one is brought into play. The switching of the blocking mechanisms is performed by the previously mentioned double pawl 185, 186, which is shifted out of engagement with the pin 187 by the setting of a key in the banks 1 or 2 and a key in the banks 3 or 4. The mechanism for this purpose will be described presently. When the pawl 185 is moved out of the range of pin 187, the pawl 186 is moved into the range of a pin 282 on a lever 283 rockably mounted on shaft 67. The upper end of lever 283 has fixed to it a pin 284 which stands opposite two blocking arms 285 and 286 extending from the respective blocking bars 143 and 275. In order to free the pin 284 the blocking arm 285 must be moved downward by depression of a pin in one of the banks 1 or 2 and the blocking arm 286 must be moved upward by depression of a key in one of the banks 3 or 4.

For switching the double pawl 185, 186 the arm 188 is connected by a pin 281 to a link 280, the upper end of which is articulated to an arm at the left end of a bail 279. At the right end of this bail, near the right-hand side wall 68 is an arm provided with a fork 276 engaging a pin 277 on a bar 226. This bar is supported by an arm 225 of a bail 224, rockably mounted on shaft 120. The bail 224 has at its left end an arm 223 engaging a pin 222 fixed to the rearwardly extending arm of a bell crank lever 220. This bell crank lever is supported upon a pin 221 projecting from an arm 219 of a bail 218, integral with bail 140. The downwardly extending arm of bell crank lever 220 is connected by a link 244 and pin 243 with a downwardly extending arm 242 of bail 241. As previously described the bail 140 is rocked in clockwise direction by depression of a key in either of the key banks 1 or 2 and bail 241 is rocked in the same direction by depression of a key in either of the key banks 3 or 4. The two movements thus imparted to the pin 222 of bell crank lever 220 are sufficient to bring the pawl 185 below the pin 187 and to move the pawl 186 down to the level of pin 282.

While the depression of a single key in the banks 1–4 determines which of the releasing keys 8 or 9 may be operated, the depression of a debit key and a credit key in the banks 1–4 leaves both releasing keys 8 and 9 free for operation. Thus the selection of these keys will be dependent upon the account of the account owner; that is to say, if this account is to be charged the releasing key 9 is pressed, while if it is to be credited the releasing key 8 is pressed.

Figure 8:
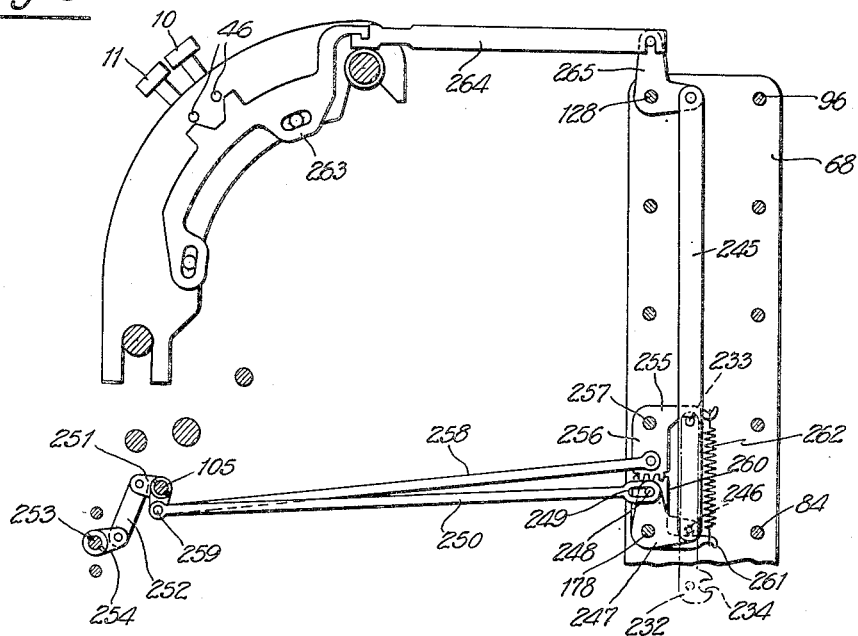

The mechanism for rendering the releasing keys 8 and 9 individually capable of coupling both balance mechanisms I and II with the differential mechanism is as follows:

For selecting the subtraction or addition side of the balance mechanism II and for coupling the same with the differential mechanism, there are provided mechanisms similar to those for the selection and engagement of the balance mechanism I previously described with reference to Figs. 6 and 5. Referring now to Figs. 8 and 5, there is rockably mounted upon the rod 178 a bell crank lever 247, the upwardly extending arm of which bears a pin 248 engaging in a slot 249 at the right-hand end of a link 250. The left-hand end of this link is connected to a bell crank lever 251 rockably mounted upon the shaft 105. The other arm of the bell crank lever 251 is connected by a link 252 to an arm 254 fixed to a shaft 253, which serves for selection of the proper side (plus or minus) of the balance mechanism II. This selection is made through mechanism similar to that previously described for the balance mechanism I. Returning to the bell crank lever 247, its horizontally extending arm pivotally engages a pin 246 fixed to a bar 245. The pin 248 stands over an arm 261 of a toothed sector 260 which is in mesh with a toothed sector 256 rockably mounted upon a rod 257. The sector 256 is connected by a link 258 to an arm 259 rigidly fastened on shaft 105. This shaft effects the engagement of the balance mechanism II with the differential members, through mechanism similar to that previously described with reference to the balance mechanism I. The sector 256 has a rearwardly extending arm 255 connected by a spring 262 to the arm 261 of sector 260. The arm 255 is held by the spring against a pin 233 fixed to the bar 245. Movement of the bar either up or down will engage the balance mechanism II with the differential members, through the link 258. Downward movement of the bar 245 will select the addition side of the balance mechanism II, by pulling rod 250 to the right, while upward movement of the bar 245 will simply cause the pin 248 to move to the left in slot 249, leaving the balance mechanism II in position for engagement of the subtraction side.

For the joint engagement of the balance mechanism II and balance mechanism I the bar 245 is coupled to the bar 98 which controls the balance mechanism I and is controlled by the keys 8 and 9. For this purpose there is suspended from the pin 109 on bar 98 a link 236, at the lower end of which is a pin 235. The pin 233 on the bar 245 has suspended from it a latch 232 whose lower forked end 234 stands opposite the pin 235. This latch is connected by a link 231 to an arm 230 of a bail 228 rockably mounted upon a rod 229. The other arm 227 of the bail is connected to the bar 226, to which the movements of the pin 222 on bell crank lever 220 are imparted through bail 224. The combined movements of pin 222 caused by depression of a key in rows 1 or 2 and a key in rows 3 or 4 is sufficient to bring the latch fork 234 into engagement with the pin 235, with the result that the mechanism for controlling the balance mechanism II is operated simultaneously with that for controlling the balance mechanism I. It will be noted that these controlling mechanisms are so related that when the addition side of the balance mechanism I is selected the subtraction side of the balance mechanism II is selected, and vice versa.

In certain cases the plus or minus side of the balance mechanism II and its engagement with the differential members can be performed directly by pressing one of the keys 10 or 11, whose pins 46 act upon a slide 263 coupled by a bar 264 and bell crank lever 265 with the bar 245.

By pressing the releasing key 8 the printing mechanisms are set to print in the credits column of the record sheets for the account in the manner previously described. As described in my co-pending application Serial No. 226,467 the printing mechanism prints in the debits column of the contra-account and the credits column of the account simultaneously, or in the credits column of the contra-account and the debits column of the account.

The release of the machine operation by pressing the releasing key 8 takes place through the parts 46, 120, 121, 125 (Fig. 7), which turn the bail 126 in clockwise direction, whereby its arm 175 acts upon the link 176 (Figs. 5 and 7). Through the parts 177, 179, 180, 183, 184, 186 the lever 283 can be swung in clockwise direction, because, as previously described, the arms 285 and 286 of locking bars 143 and 275 have been moved out of the range of pins 284 by the setting of the debit and credit keys. Simultaneously the square pin 127 (Figs. 5 and 7) releases the lever 129, so that under the pull of a spring (not shown) the releasing shaft 133 is rocked in clockwise direction.

If several postings are to be made to the same account totalizer in succession, it is desirable to retain the set totalizer keys 25–28 in their depressed position. For this purpose repeat keys 32 (Figs. 1 and 1a) are provided, which prevent the release of the depressed setting members 25–28 at the end of a machine operation. Since the setting members 25–28 may also remain in depressed position during "old balance" machine operations and "new balance" machine operations, precautions are taken to prevent the selection and engagement of the corresponding debit or credit totalizer in these operations, as well as the selection of the debit and credit columns of the record sheets for printing, the setting of the special sign for printing, and the advancement of the corresponding item counters. The mechanisms for suppressing the control of the debit and credit keys over the selection of the columns of the record sheets to be printed upon and the setting of the special sign for printing have already been explained. The mechanism for controlling the advancement of the item counter forms no part of the present invention.

In drawing a sub-total or an end-total by means of keys 29 or 30, there may always be depressed only one of the keys 14–28, particularly one of the keys 25–28. For this purpose, a device is provided which prevents the release of the machine when more than one of these keys is depressed. As previously described, a pin 222 (Fig. 5a) of the bell crank lever 220 drops for a certain distance upon depression of a key 26. Upon the pin 222 is hung a bar 287, the lower end of which is in the form of a fork 288. To this fork 288 is fixed a pin 289 which coacts with two fingers 290 and 291 and an intermediate notch 292 of a locking bar 293. The locking bar 293 is supported upon an arm 294 of a bail 295, which is under the control of key bank 5 (keys 14–24) through a bar 296 (Figs. 4 and 5a). The bail is rockably mounted upon rod 96. The bar 293 is connected to an arm 297 mounted by its hub 298 upon a shaft 299. By pressing a key 29 or 30 (Fig. 7), through the parts 120, 121, 125, 126, 175, 176, 177 (Figs. 5a and 5b), an arm 300 riveted to the bail 177 is swung in clockwise direction. To the arm 300 is connected a bar 301 which bears on its upper end a fork 302. With the fork 302 coacts a pin 303 riveted to a bell crank lever 304. The latter is rockably mounted upon shaft 299 and bears a pin 305 which engages in the fork 288 of bar 287. Since this blocking mechanism is only to be effective on operations controlled by the keys 29, 30, provision is made for disabling it during the other operations of the machine. The fork 302 has an opening 302a which normally allows the pin 303 to slip out of the fork as the latter moves downward when the bail 177 is rocked in clockwise direction, as it is on each operation of a machine releasing key. To couple the fork 302 with the pin 303 there is provided on the bar 301 a pin 330 connected by a link 331 to a bail 327 rockably mounted upon shaft 182. The bail 327 has at its middle an arm 326 provided with a pin 325 engaging a fork 338 of a bell crank lever 324 rockably mounted on shaft 299. A horizontally extending arm of this bell crank lever straddles a pin 323 mounted on one arm of a bail 332 rockably mounted on shaft 67. A link 322 connects the pin 323 to one arm of a bell crank lever 321 rockably mounted on shaft 96. The other arm of this bell crank lever is connected by a link 320 (Figs. 5 and 5a), similar to the link 93, to a slide 319 (Fig. 1) moved upward by either of the keys 29 or 30. This motion, through the mechanism described, rocks the bar 301 to engage the overhanging lip of fork 302 over the pin 303, so that the latter will be moved downward by the rocking of bail 177. By means of the described mechanism, when a key 29 or 30 has been punched, the pin 289, lowered by depression of a key 26 or 28, is pressed into the notch 292 of bar 293.

If both a key 26 and a key 28 are in their depressed positions, the pin 222 in bell crank lever 220 (Fig. 5) as previously described, is lowered by two partial movements, whereby through bar 287 the pin 289 is brought in front of the finger 291. Consequently neither the release key 29 nor the release key 30 can be pressed. If only a key 26 is depressed, or if only a key 28 is depressed, the pin 289 is brought by the single partial movement opposite notch 292, permitting depression of key 29 or key 30. If only a key in bank 5 is depressed bar 293 is raised to bring notch 292 opposite pin 289, but if a key 26, or a key 28, or both are depressed, the pin 289 moves down opposite finger 291 and keys 29 and 30 are blocked. The effect is the same if a key of the bank 5 is depressed simultaneously with a key 26 or a key 28.

The pawl 180 (Fig. 5) which acts upon the releasing mechanism in the registration of debits and credits is brought out of the range of pin 181, in registering old balances, in drawing new balances, and in drawing sub-totals or end-totals. For this purpose there is fixed to the pawl 180 a pin 310 which extends through slots 309 in each of three bars 306, 307, 308. The bar 306 is pivoted to an arm 337 at the left end of bail 333, which, as previously described, is rocked by operation of either of the keys 29 or 30. The bar 307 is connected to the pin 203 of bell crank lever 202, which, as previously described, is rocked by either of the keys 12 or 13. The bar 308 is pivotally connected to an arm 334 at the left end of a bail 335 rockably mounted on shaft 67. A fork 336 at the right end of this bail engages pin 63, which is raised each time a key of the bank 5 is operated, through mechanism previously described. Thus in each of these three kinds of operations the pawl 180 is disengaged and the blocking mechanism associated with it is made inoperative.

The blocking assembly is inserted in the bookkeeping machine, which is mounted between the casing walls 506 of the machine frame. The arrangement is such that the blocking assembly is inserted beside the groups of totalizers of the bookkeeping machine and directly behind the setting field consisting of the key banks 1–6.

I claim:

1. In a bookkeeping machine, a pair of preliminary setting members, a pair of secondary setting members, a feeler, impelling means operated differently by the respectve secondary setting members to impel said feeler along different paths of movement, blocking means normally blocking both of said paths of movement and means whereby said blocking means are shifted by the respective preliminary setting members to unblock said paths of movement of said feeler alternatively.

2. In a bookkeeping machine, a pair of preliminary setting members, a pair of secondary setting members, a feeler, impelling means operated differently by the respective secondary setting members to impel said feeler along different paths of movement, blocking means normally blocking both of said paths of movement, means whereby said blocking means are shifted by the respective preliminary setting members to unblock said paths of movement of said feeler alternatively, a second feeler, impelling means operated by either of said secondary setting members to impel said second feeler along a certain path, a second blocking means normally blocking said path, means whereby the joint operation of both of said preliminary setting members shifts said second blocking means to unblock the path of movement of said second feeler, and means controlled by said preliminary setting members for switching said impelling means so that they are alternatively operated by said secondary setting members.

3. In a bookkeeping machine, a pair of preliminary setting members, a pair of secondary setting members, a feeler, impelling means operated differently by the respective secondary setting members to impel said feeler along different paths of movement, two blocking members respectively blocking said paths of movement in their normal position, and two actuating mechanisms controlled respectively by said preliminary setting members for shifting the respective blocking members to unblocking position.

4. In a bookkeeping machine, a pair of preliminary setting members, a pair of secondary setting members, a feeler, impelling means operated differently by the respective secondary setting members to impel said feeler along different paths of movement, two blocking members respectively blocking said paths of movement in their normal position, and two actuating mechanisms controlled respectively by said preliminary setting members for shifting the respective setting members to unblock the path of movement of said feeler which it normally blocks and to block the other path of movement.

5. In a bookkeeping machine, a pair of preliminary setting members, a pair of secondary setting members, and two sets of blocking devices for said secondary setting members controlled by said preliminary setting members, one of said sets comprising a feeler and two blocking members coacting therewith, actuating means separately operated by said preliminary setting members for shifting the respective blocking members between two positions, impelling means operated differently by the respective secondary setting members to impel said feeler along different paths of movement, said blocking members having blocking faces so related to said feeler that when neither of said preliminary setting members is set one of said blocking faces stands across one of said paths of movement of said feeler and the other of said blocking faces stands across the other path of movement of said feeler, said blocking faces being respectively shifted by the setting of said preliminary setting members to clear the respective paths of movement of said feeler, the other of said sets of blocking devices comprising a second blocking face on each of said blocking members, a second feeler coacting therewith, and impelling means operated by either of said secondary setting members to impel said second feeler toward said second blocking faces, said second blocking faces normally standing in the path of movement of said second feeler and being displaced therefrom by the operation of their respective setting members, and means for alternatively disabling the two impelling means.

6. In a bookkeeping machine, a plurality of sets of setting members, a machine releasing member, blocking means for said machine releasing member comprising two blocking elements respectively operated by different sets of said setting members to move one with respect to the other, said blocking elements having cooperating blocking faces adapted to be brought out of register by movement of either of said blocking elements resulting from the operation of the appurtenant set of setting members, and connections between said machine releasing member and one of said blocking elements whereby the latter is moved positively toward the other blocking element upon operation of said machine releasing member.

7. In a bookkeeping machine, a plurality of sets of setting members, machine releasing means comprising a plurality of keys and a releasing mechanism operable by any one of said machine releasing keys; blocking means for said machine releasing means; adjusting means for said blocking means adapted to be controlled by said sets of setting members, so as to prevent the operation of said machine releasing means when setting members from more or less than one of said sets have been operated; said blocking means including means normally rendering the same inoperative; and means controlled by at least one of said machine releasing keys for rendering said blocking means operative.

8. A bookkeeping machine as described in claim 7 wherein said blocking means comprise two interengaging elements and means whereby one of said interengaging elements is moved to unblocking position by the operation of a setting member of one of said sets, and means whereby the other of said interengaging elements is moved to unblocking position by the operation of a setting member of any one of a plurality of other sets.

9. In a bookkeeping machine, at least three sets of setting members, a machine releasing member, a single blocking means for said machine releasing member controlled jointly by the setting members of each of said sets; said blocking means being adapted to block said machine releasing member in its normal position when none of said setting members has been operated, being movable by the operation of a single setting member in any one of said sets to unblock said machine releasing member, and being movable progressively by operation of setting members in more than one of said sets to block said machine releasing member.

10. In a bookkeeping machine, a plurality of sets of setting members, a plurality of machine releasing members, blocking means for said machine releasing members controlled by said setting members, said blocking means being adapted to block said machine releasing members when none of said setting members has been operated and being operated differently by setting members of the different sets to unblock said machine releasing members selectively, and means movable progressively by operation of setting members of more than one of said sets to disable said blocking means.

KURT AURBACH.